United States Patent Office 2,826,609
Patented Mar. 11, 1958

2,826,609

PROCESS FOR THE MANUFACTURE OF PIMELIC ACID

Jonas Kamlet, New York, N. Y., assignor to The Goodyear Tire & Rubber Company, a corporation of Ohio No Drawing. Application September 10, 1954
Serial No. 455,355

11 Claims. (Cl. 260—537)

This invention relates to a process for the manufacture of pimelic acid and, more particularly, to an improved process whereby pimelic acid may be obtained in excellent yields from relatively inexpensive and readily preparable raw materials. It has for its purpose to provide an improved process whereby pimelic acid can be manufactured at costs competitive with other dibasic acids.

Pimelic acid is not now an article of commerce, although it is potentially of great value in the synthesis and manufacture of plasticizer esters, linear polyamides for fibers, filaments and plastics, alkyd resins, polyesters, polyurethanes, elastomers and a wide variety of other useful products.

Pimelic acid has heretofore been synthesized by the Claisen condensation of cyclohexanone with oxalate esters, followed by decarboxylation and alkaline hydrolysis (Organic Synthesis, Coll. vol. II, 531–534); by the sodium reduction of salicyclic acid (Muller, Monatshefte 65, 18 (1935), Muller and Rolz, ibid., 48, 734 (1927)); Organic Syntheses, Coll. vol. II, 535–538; Einhorn and Lumsden, Annalen 286, 259, 266 (1895); Walker and Lumsden, Journ. Chem. Soc. 79, 1198 (1901); by the alkaline hydrolysis of 2-cyanocylohexanone (Meyer, Helv. Chim. Acta 16, 1293 (1933), Mousseron, Jullien and Jolchine, Soc. Chim. France, 1950 M, 1209–1217; by the alkaline hydrolysis of cyclohexanone-1-carboxylic acid-2-ethyl ester (Grunfeld and Batigne, U. S. Patent 2,466,588 (1949)) and by the catalyzed interaction of cyclohexanone with carbon dioxide under pressure (Farlow and Whitman, U. S. Patent 2,390,576 (1945)). These methods have not, however, permitted pimelic acid to be manufactured industrially at a price competitive with other dibasic acids.

Another approach to the synthesis of pimelic acid involves the reaction with caustic soda, either in an aqueous medium at super-atmospheric pressures, or in a caustic fusion, at temperatures between 250° C. and 400° C. of a compound of the general formula

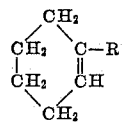

where R is chosen from the group of substituents consisting of —COOH, —CN and —CHO.

These intermediates may be prepared by one of the following procedures:

(a) Salicylic acid is hydrogenated in aqueous solution (as the free acid or a water-soluble salt) or it is converted to an ester and the latter is hydrogenated in an alcoholic solution to the corresponding hexahydrosalicylate. By reaction with a dehydrating agent (such as conc. sulfuric acid, anhydrous zinc chloride or phosphorus pentoxide), or by heating at advanced temperatures preferably in the presence of alkali, a molecule of water is eliminated with the formation of the corresponding delta-1-tetrahydrobenzoate or benzoic acid, e. g.

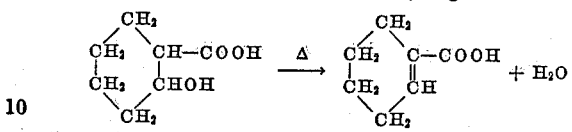

Since the dehydration in alkaline media is effected at temperatures up to 250°–270° C. and the scission of the delta-1-tetrahydrobenzoate to pimelic acid occurs in alkaline media at 250° C. to 400° C., these two steps may be effected concurrently or consecutively in the same reaction. As the hexahydrosalicylate is heated to 250°–270° C., dehydration occurs and as the temperature is then further maintained within this range or raised to 270°–400° C., the scission at the double bond with the formation of pimelic acid occurs, without the isolation of the intermediate delta-1-tetrahydrobenzoate (Werber, Jansen and Gresham, Journ. Amer. Chem. Soc. 74, 532–535 (1952)); Pistor and Plieninger, Annalen 562, 239–245 (1949); I. B. Farbenindustrie, French Patent 649,626 (1928) and British Patent 286,201 (1927); Mousseron and Jacquier, Bull. Soc. Chim. France (1950), 648–659, Comptes rendus 229, 216–218 (1949); Ungnade, Journ. Amer. Chem. Soc. 70, 1898–9 (1948).

(b) Acrylonitrile, acrolein, acrylic acid or an ester of acrylic acid is reacted with butadiene in a Diels-Alder condensation, and the resultant delta-3 tetrahydrobenzoic acid derivative (i. e. nitrile, aldehyde, acid or ester, respectively) is isomerized to the corresponding delta-1-tetrahydrobenzoic acid derivative. This isomerization may be effected by the use of acid or alkaline catalysts, by the use of advanced temperatures (up to 270° C.) and preferably by the use of alkali metal hydroxides, either in solution under pressure or in caustic fusions

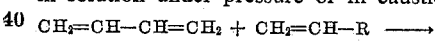

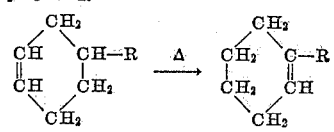

Here again, the isomerization and the scission may be effected concurrently or consecutively in the same reaction. As the delta-3-tetrahydrobenzoate derivative is heated to 250°–270° C., it is isomerized to the corresponding delta-1 derivative and as the temperature is then further maintained within this range or is raised to 270°–400° C., scission occurs at the double bond with the formation of pimelic acid without the isolation of the intermediate delta-1-tetrahydrobenzoate derivative. In the case of delta-3-tetrahydrobenzaldehyde, this compound forms a trimer in the presence of an acid catalyst (Chayanov, Journ. Gen. Chem. U. S. S. R., 8, 460–474 (1938)) which trimer reacts exactly as does the monomer and may be employed in the same manner in the process of this invention (Werber, Jansen and Gresham, cited above; Major and Stanley, U. S. Patent 2,673,219 (1954); Pistor and Plieninger, cited above).

These reactions all involve a dehydrogenation, with the formation of molecular hydrogen, at the advanced temperatures in the presence of the alkali. Such reactions rarely give good yields since the evolution of hydrogen under pressure often tends to reverse the reaction, i. e. effect a hydrogenation of the products formed:

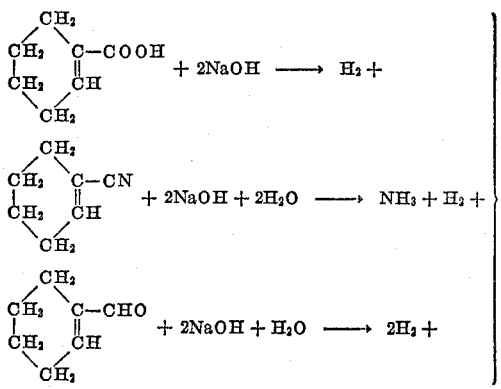

Yields of 75% of theory are rarely if ever exceeded by processes of this type involving dehydrogenations at advanced temperatures, and are usually much lower. It is a further purpose of the process of this invention to provide an improved method whereby yields in excess of 90% of theory and approaching the quantitative may be obtained.

The basis of my invention is the finding that near-quantitative yields of pimelic acid may be obtained by the reaction of an alkali metal hydroxide, in an aqueous medium or in a caustic fusion, with a compound of the general formula:

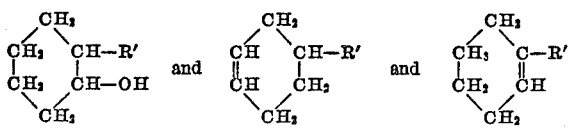

(where R' is chosen from the group of substituents consisting of —CH$_2$OH, —CHO, —COOR'', —CONH$_2$ and —CN and R'' is a member of the group consisting of hydrogen, alkali metal, alkyl and aryl) in the presence of at least a reacting proportion of a member of the group consisting of sulfur, alkali metal polysulfides and inorganic sulfurous compounds containing sulfur atoms at a valence level above minus two and below plus six, at a temperature between 200° C. and 400° C., and preferably at a temperature between 300° C. and 350° C.

The starting materials for the process of this invention may be prepared:

(a) By hydrogenation in aqueous and/or alcoholic solution of salicylic acid or a salt or ester thereof, salicylaldehyde, salicylamide, O-hydroxybenzonitrile, O-hydroxybenzyl alcohol. This hydrogenation may be effected with conventional catalysts (such as Raney nickel, Raney cobalt, Adams platinum catalyst, copper chromite, reduced nickel, etc.) at atmospheric or superatmospheric pressures by the procedures well known in the art. Thus salicylic acid, its salts and esters yield hexahydrosalicylic acid, its corresponding salts and esters and these are dehydrated under the conditions of the reaction (i. e. reaction with alkali at 200°–400° C. to the corresponding delta-1-tetrahydrobenzoate derivatives) which then undergo scission to pimelic acid. Salicylaldehyde yields hexahydrosalicylaldehyde and hexahydrosaligenin which is dehydrated to the corresponding delta-1-tetrahydrobenzaldehyde and delta-1-tetrahydrobenzylalcohol, which are converted by the reaction of this invention to pimelic acid. Salicylamide, O-hydroxybenzonitrile and O-hydroxybenzyl alcohol (saligenin) are similarly converted to the hexahydro derivatives, dehydrated to the delta-1 derivatives and undergo scission at the double bond to form pimelic acid.

(b) By a Diels-Alder reaction of butadiene with allyl alcohol (to form delta-3-tetrahydrobenzyl alcohol), acrolein (to form delta-3-tetrahydrobenzaldehyde), acrylic acid or a salt or ester of acrylic acid (to form delta-3- tetrahydrobenzoic acid or the corresponding salt or ester of tetrahydrobenzoic acid), acrylamide (to form delta-3-tetrahydrobenzamide) or acrylonitrile (to form delta-3-tetrahydrobenzonitrile). As previously indicated, the trimer as well as the monomer of delta-3-tetrahydrobenzaldehyde may be employed in this process with equally good yields.

These delta-3 Diels-Alder adducts may be isomerized to the corresponding delta-1 adducts by the use of acid or alkaline catalysts, by the use of advanced temperatures (up to 270° C.) and preferably by use of alkali metal hydroxides in solution under pressure or in caustic fusions. As previously indicated, this isomerization may be effected as a separate step prior to the ring scission to pimelic acid. It may also be effected in the same reaction as the ring scission, without the intermediate isolation of the isomerized delta-1 derivative.

The primary purpose of the sulfur, alkali metal polysulfide or inorganic sulfurous compound (with sulfur valence between minus two and plus six) is to serve as a hydrogen acceptor. By reacting as a hydrogen acceptor, it removes the hydrogen from the field of the reaction and thus prevents it from serving to reverse the reaction, i. e. as a hydrogenating agent. In this manner, the reaction is permitted to go to substantial completion and markedly better yields are obtained than are possible in the absence of the sulfur compound. This reaction may be described by the following equations (for the purpose of simplicity):

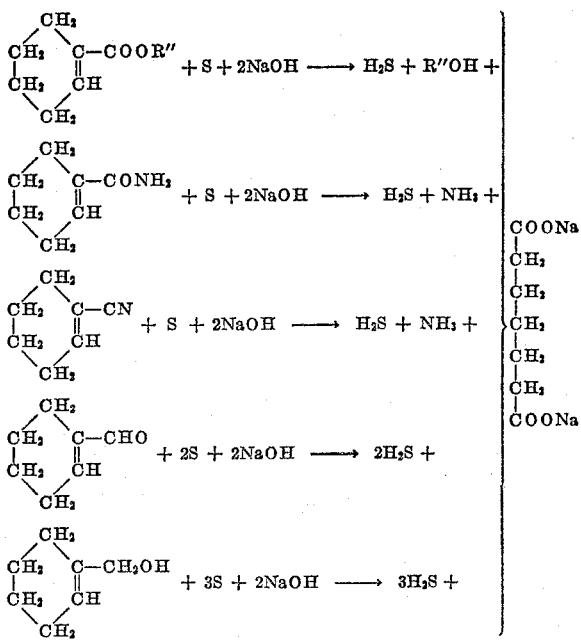

It is desirable to employ at least two moles of alkali metal hydroxide and preferably four moles of alkali metal hydroxide for each mole of organic compound. If at least four moles of the alkali are employed, the H$_2$S formed is neutralized and converted to the corresponding alkali metal sulfide. The preferred alkali to employ is potassium hydroxide but sodium hydroxide is a more economical reagent and gives almost identical yields. By using sufficient alkali to neutralize the H$_2$S formed, the reactions of this invention may be effected at much lower pressures and temperatures than is the case when hydrogen is evolved during the dehydrogenative scission. The alkali metal pimelate obtained by this process may then be converted to pimelic acid by the well known technic of acidifying the aqueous solution of the salt, filtering or centrifuging off the free acid, washing and drying.

The mode of action of the sulfur, alkali metal polysulfide or inorganic sulfurous compound in the process of this invention is considerably more complex than the above simplified equation may imply. Upon mixing sulfur with alkali metal hydroxide, even at comparatively low temperatures, a mixture of alkali metal sulfide and alkali metal thiosulfate is obtained. The alkali metal thiosulfate is the actual dehydrogenating agent and may be reduced through the hydrosulfite, tetrathionate, sulfite and intermediate stages to the alkali metal sulfide. Thus, the alkali metal hydrosulfites, tetrathionates, thiosulfates, sulfites and hyposulfites may be employed as hydrogen acceptors or dehydrogenation agents in this process or, in fact, all inorganic sulfurous compounds in which the sulfur atoms exist in a valence state above minus two and below plus six. In the alkali metal polysulfides, the polysulfide sulfur reacts like elemental sulfur and may be considered as a coordination compound of elemental sulfur and alkali metal sulfide. However, elemental sulfur is the cheapest and most readily available hydrogen acceptor and is the preferred reagent in the process of this invention. It is preferred to employ a small excess (about 20%) of hydrogen acceptor (e. g. sulfur) over the amount theoretically required to effect the dehydrogenation, which might also be considered as an oxidation).

The following examples are given to define and to illustrate this invention but in no way to limit it to reagents, proportions and conditions described therein. Obvious modifications will occur to persons skilled in the art. Proportions given are in parts by weight.

*Example I*

1530 parts of methyl salicylate (10 moles) dissolved in 6000 parts of methanol are mixed with 300 parts of activated Raney nickel and hydrogenated in an autoclave under a hydrogen pressure of 3000–3500 p. s. i. at a temperature of 140°–145° C. for five to six hours. The reaction mixture is cooled, the catalyst is filtered off and the solvent distilled off and recovered. The residual methyl hexahydrosalicylate (1570–1580 parts) is added to 1760 parts of caustic soda (44 moles), 384 parts of powdered sulfur (12 moles) and 550 parts of water, and the reaction mixture is heated in the autoclave to a temperature of 300°–320° C. and maintained within that range, with agitation for ten hours. The reaction mixture is then cooled, acidified by the addition of 70% sulfuric acid, boiled for a short time to expel hydrogen sulfide and then cooled to 10°–20° C. The copious precipitate is filtered off and dried. A single recrystallization from hot benzene yields 1488 parts of pure pimelic acid, M. P. 105°–106° C., equivalent to a yield of 93% of theory.

*Example II*

540 parts of butadiene (10 moles), 530 parts of acrylonitrile (10 moles) and one part of hydroquinone (to inhibit polymerization of the reagents) are heated in a copper-lined autoclave at 140°–150° C. for eight hours. The contents of the autoclave are now mixed with 1760 parts of caustic soda (44 moles), 384 parts of powdered sulfur (12 moles) and 550 parts of water, and the reaction mixture is heated in the autoclave to a temperature of 320°–330° C. and is maintained within that range, with agitation for twelve hours. The reaction mixture is then cooled, acidified by the addition of 70% sulfuric acid, boiled for a short time to expel hydrogen sulfide and then cooled to 10°–20° C. The precipitate is filtered off, dried and recrystallized from hot benzene. The yield of pimelic acid, M. P. 104°–106° C., is 1440 parts, equivalent to 90% of theory.

*Example III*

720 parts of glacial acrylic acid (10 moles), 540 parts of butadiene (10 moles) and one gram of hydroquinone are heated in a copper-lined autoclave at 160°–170° C. for three hours. The contents of the autoclave are now mixed with 5000 parts of caustic potash and 1320 parts of sodium disulfide (12 moles) and the reaction mixture is fused with stirring at 360°–370° C. for an hour. It is then cooled, dissolved in 5000 parts of boiling water, acidified with 70% sulfuric acid, boiled for a short time to expel hydrogen sulfide and then cooled to 10°–20° C. The precipitate is filtered off, dried and recrystallized from benzene. The yield of pimelic acid, M. P. 105°–106° C., is 1436 parts, equivalent to 90% of theory.

Having described my invention, what I claim and desire to protect by Letters Patent is:

1. A process for the manufacture of pimelic acid which comprises reacting a member chosen from the group of compounds consisting of

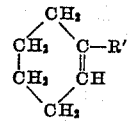

where R' is chosen from the group of substituents consisting of —CH$_2$OH, —CHO, —COOH, COOK, COONa, COOalkyl, —CONH$_2$ and —CN with an alkali metal hydroxide in the presence of a hydrogen acceptor chosen from the group consisting of elemental sulfur, alkali metal polysulfides and the inorganic sulfurous compounds containing sulfur atoms at a valence level above minus two and below plus six, at a temperature between 200° C. and 400° C., and acidifying the resultant alkali metal pimelate.

2. The process of claim 1 effected at a temperature of 300° C. to 350° C.

3. The process of claim 1 in which the hydrogen acceptor is elemental sulfur.

4. The process of claim 1 in which the hydrogen acceptor is an alkali metal polysulfide.

5. The process of claim 1 in which the alkali metal hydroxide is sodium hydroxide.

6. The process of claim 1 in which the alkali metal hydroxide is potassium hydroxide.

7. The process of claim 1 in which the hydrogen acceptor is employed in quantity equivalent at least to reacting proportions.

8. The process of claim 1 in which four moles of alkali metal hydroxide are employed for every mole of organic compound reacted.

9. The process of claim 1 in which the compound reacted is an alkali metal salt of delta-1-tetrahydrobenzoic acid formed by the intramolecular dehydration of the corresponding alkali metal salt of hexahydrosalicylic acid.

10. The process of claim 1 in which the compound reacted is delta-1-tetrahydrobenzonitrile formed by the alkali-catalyzed isomerization of delta-3-tetrahydrobenzonitrile.

11. The process of claim 1 in which the compound reacted is delta-1-tetrahydrobenzaldehyde formed by the alkali-catalyzed isomerization of delta-3-tetrahydrobenzaldehyde.

References Cited in the file of this patent

UNITED STATES PATENTS

| | | |
|---|---|---|
| 2,587,666 | Toland | Mar. 4, 1952 |
| 2,670,370 | Toland | Feb. 23, 1954 |
| 2,673,219 | Major et al. | Mar. 23, 1954 |